US007359917B2

(12) United States Patent
Winter et al.

(10) Patent No.: US 7,359,917 B2
(45) Date of Patent: Apr. 15, 2008

(54) METHOD AND APPARATUS FOR AUTOMATIC DETECTION OF DATA TYPES FOR DATA TYPE DEPENDENT PROCESSING

(75) Inventors: Marco Winter, Hannover (DE); Dirk Adolph, Ronnenberg (DE); Jobst Hörentrup, Hannover (DE)

(73) Assignee: Thomson Licensing LLC, Boulogne-Billancourt (FR)

( * ) Notice: Subject to any disclaimer, the term of this patent is extended or adjusted under 35 U.S.C. 154(b) by 96 days.

(21) Appl. No.: 10/500,204

(22) PCT Filed: Dec. 14, 2002

(86) PCT No.: PCT/EP02/14266

§ 371 (c)(1),
(2), (4) Date: Jun. 28, 2004

(87) PCT Pub. No.: WO03/056454

PCT Pub. Date: Jul. 10, 2003

(65) Prior Publication Data

US 2005/0015402 A1    Jan. 20, 2005

(30) Foreign Application Priority Data

Dec. 28, 2001   (EP)   ................................. 01131036

(51) Int. Cl.
*G06F 17/00*   (2006.01)
(52) U.S. Cl. ..................... 707/104.1; 707/10; 707/100; 707/102; 707/103; 709/223
(58) Field of Classification Search ..................... None
See application file for complete search history.

(56) References Cited

U.S. PATENT DOCUMENTS

| 5,864,870 | A | * | 1/1999 | Guck | 707/104.1 |
| 6,128,621 | A | * | 10/2000 | Weisz | 707/103 Y |
| 6,360,951 | B1 | * | 3/2002 | Swinehart | 235/472.01 |
| 6,567,545 | B1 | * | 5/2003 | Kobara et al. | 382/175 |
| 6,662,186 | B1 | * | 12/2003 | Esquibel et al. | 707/101 |

FOREIGN PATENT DOCUMENTS

GB    2212636    7/1989

OTHER PUBLICATIONS

K. Shoene et al: "The Rufus System: Information organization for semi-structured data" Proceedings of the International Conference on Very Large Data Bases, Aug. 24, 1993, pp. 97-107.

* cited by examiner

*Primary Examiner*—Sathyanarayan Pannala
(74) *Attorney, Agent, or Firm*—Joseph J. Laks; Harvey D. Fried; Joel M. Fogelson

(57) ABSTRACT

A method for automatic detection of data types for data type dependent processing has two orthogonal classification systems defined, and determines for incoming data items a data type according to the first classification system and another data type according to the second classification system. The first classification system comprises the data types Essence, Metadata and Container. The second classification system comprises the data types Physical Data and Abstract Data. A default data type may be defined for data items not being uniquely classifiable. Advantageously, the inventive method can be used when different classes of data items require different methods for processing, e.g. content searching.

5 Claims, 3 Drawing Sheets

Figures 1, 2:
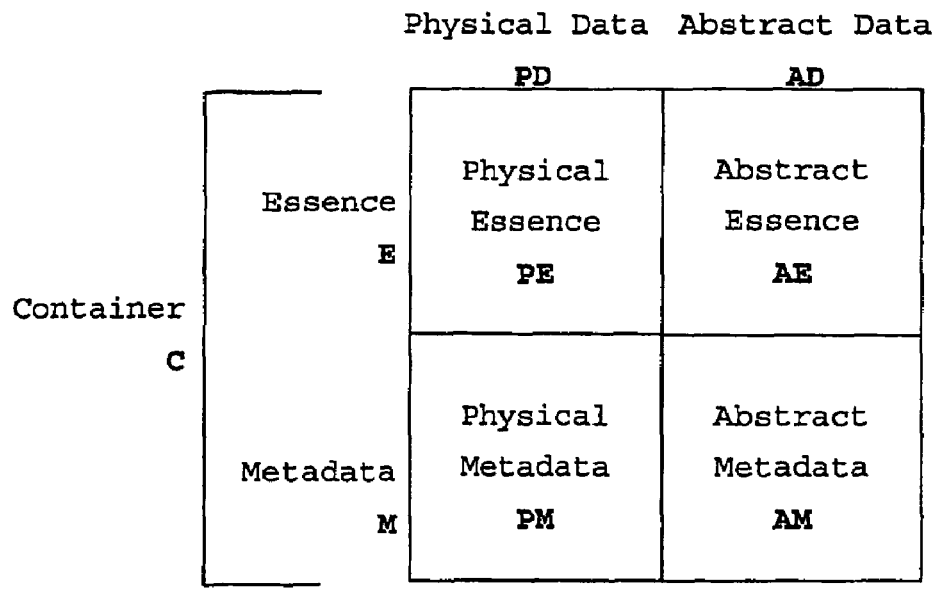

```
<html>
    <head>
        <title>This is the title </title>
    </head>
    <body>
        <a href="http://www.w3c.org">W3C HOME</a>
        <p> This is a pararaph </p>
        <a href="http://www.w3c.org">
            <img src="image.gif">
        </a>
    </body>
</html>
```

METHOD AND APPARATUS FOR AUTOMATIC DETECTION OF DATA TYPES FOR DATA TYPE DEPENDENT PROCESSING

This application claims the benefit, under 35 U.S.C. § 365 of International Application PCT/EP02/14266 filed Dec. 14, 2002, which was published in accordance with PCT Article 21(2) on Jul. 10, 2003 in English and which claims the benefit of European patent application No. 01131036.4, filed Dec. 28, 2001.

The invention relates to a method and an apparatus for the classification, organization and structuring of different types of data, which can be used e.g. for data sorting, data storage or data retrieval.

BACKGROUND

The capacity of digital storage media like hard disks or rewritable optical disks for personal recording of video and other data grows continuously. This results in new concepts like e.g. the so-called home server, which is a central storage device with large capacity for recording any kind of data within the home. Such applications also require new ways to organize the recorded data, search for content and access specific recordings.

For this purpose data about data, often referred to as metadata, can be used. Various industry groups and standard bodies have been developing metadata standards for different purposes and, applications. In multimedia applications, metadata typically are data about audiovisual (AV) data, these AV data often being called 'essence'. However, a Data Base Management System (DBMS) that shall be able to handle data of various data types correctly requires a definition of data types, and a method to distinguish between them.

INVENTION

The invention is based on the recognition of the facts described in the following:

In devices providing a DBMS for handling of incoming data, including incoming metadata, it is necessary to classify said incoming data, and especially incoming metadata, since different processing is necessary for different kinds of metadata. For example, a text query is not suitable for metadata containing a picture in the well-known Graphics Interchange Format (GIF).

The problem to be solved by the invention is to classify the data automatically, such that a DBMS can utilize the result of the classification for correct data handling.

According to the invention, Metadata can be defined as data sets consisting of two parts, namely a first part being a link, the link pointing to a reference data set, and a second part being any data referring to said link. In the following, said first part is referred to as MD_LINK, and said second part is referred to as MD_LOAD. Any data item that does not contain at least one MD_LINK and a related MD_LOAD is defined to be Essence. Metadata often occur together with other Metadata or Essence, combined in a logical entity like e.g. a file on a hard disc. Such mixture of different kinds of Essence and Metadata is in the following called 'Container'. Popular examples for such Containers are Hypertext Markup Language (HTML) files, or Portable Document Format (PDF) files.

Further, according to the invention there is another type of classification possible. Data may require interpretation through the device before they can be used. In this case the data are defined to be Physical Data, if the device has a method for interpretation defined, otherwise Abstract Data. If e.g. a picture is stored in GIF format, and the device can interpret GIF format and display it as a picture, it is classified as Physical Data. If the device cannot interpret GIF format, the data is classified as Abstract Data. Further examples for Abstract Data are text files, and other files that cannot be interpreted through the device.

The previously defined two types of classification are not exclusive, but complementing each other. Further, the described classification of data is not absolute, but system dependent, and therefore only locally relevant.

Advantageously, this classification allows the device to handle different data types correctly, differ between Metadata, Essence, Container, Physical Data and Abstract Data, and thus permit a generalized access method upon said data types. With this knowledge, the device can decide e.g. which type of data-query to use, how to interpret data, and if some data can be disregarded for a certain query.

Advantageous additional embodiments of the invention are disclosed in the following text, and in the respective dependent claims.

DRAWINGS

Figure 3:
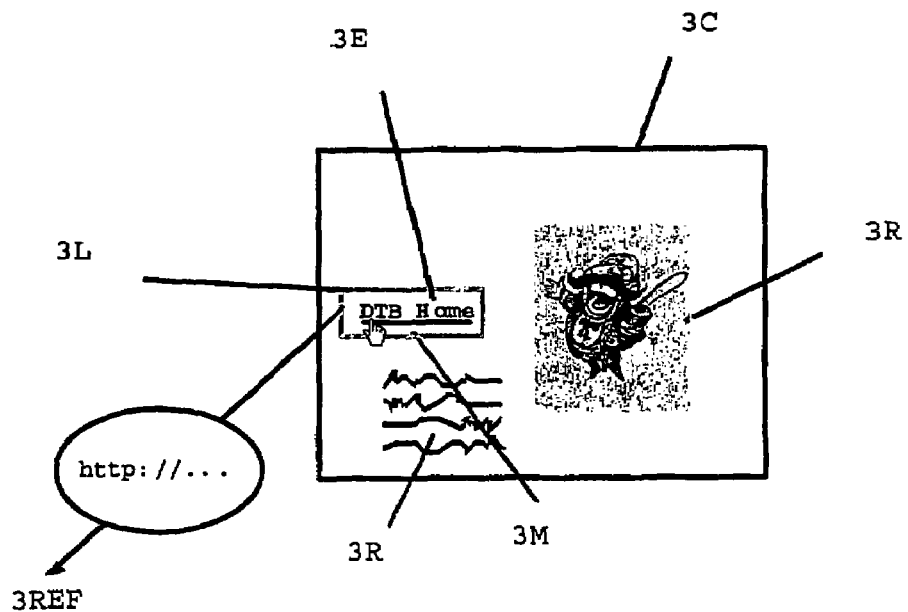
Figure 4:
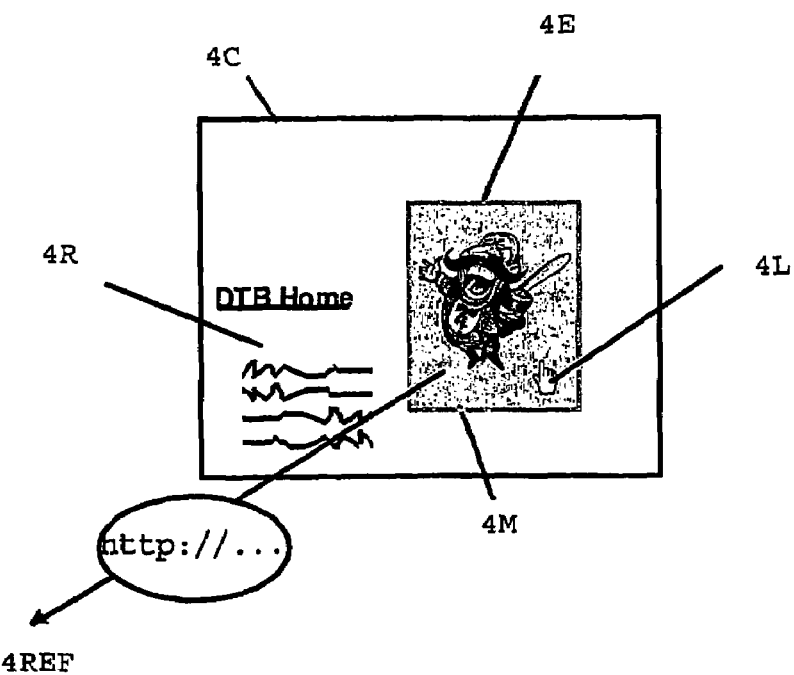

Exemplary embodiments of the invention are described with reference to the accompanying drawings, which show in:

FIG. 1 the two systems, or dimensions, of data classification;

FIG. 2 an example for a Container containing Essence and Metadata;

FIG. 3 an example for Abstract Metadata;

FIG. 4 an example for Physical Metadata; and

Figure 5:
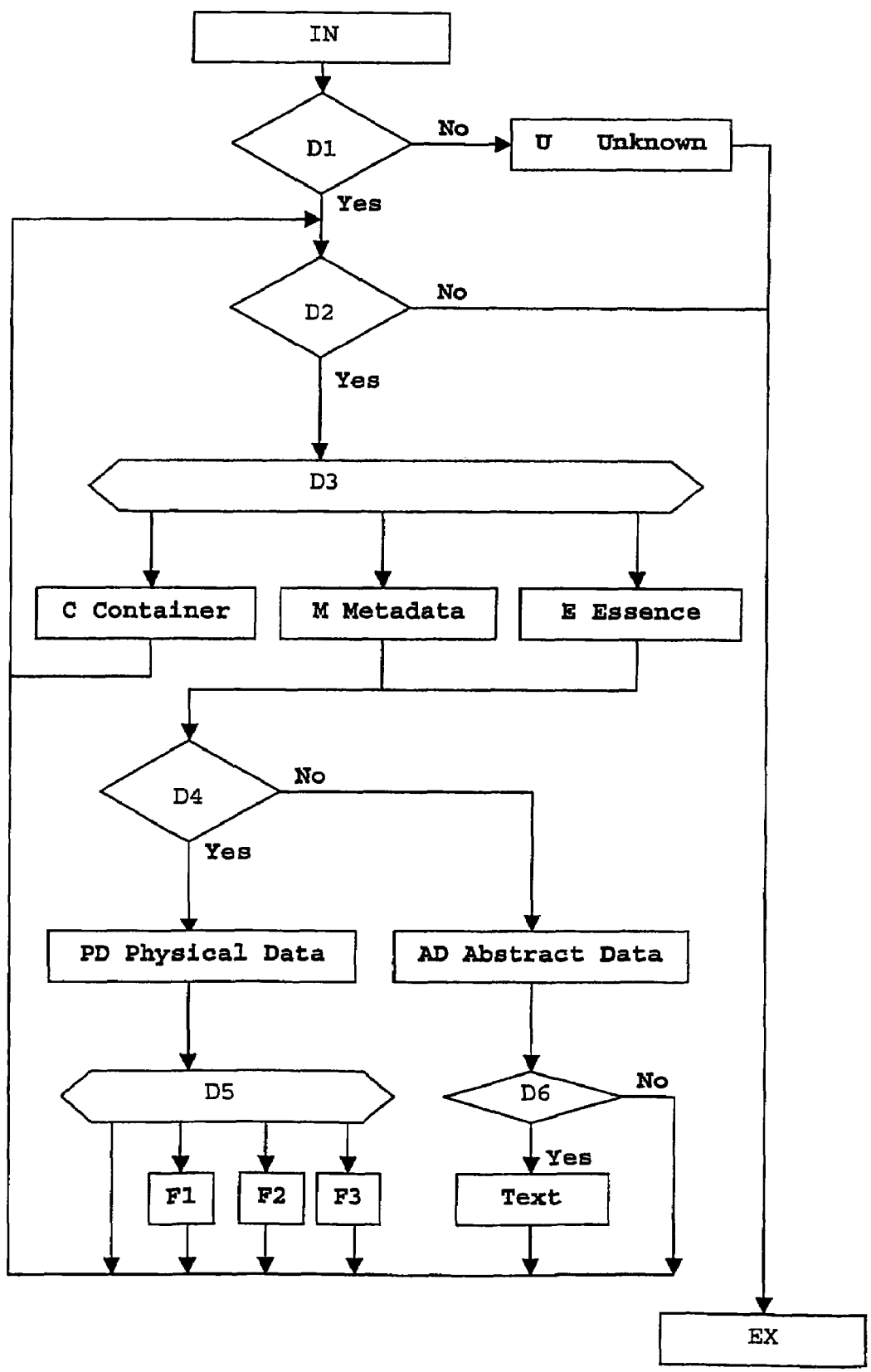

FIG. 5 an exemplary flow-chart for the method according to the invention.

EXEMPLARY EMBODIMENTS

According to the invention, the two types, or systems, of classification can be understood as two dimensions, as shown in FIG. 1. A data item may either be Essence E or Metadata M, and either Physical Data PD or Abstract Data AD. Therefore the possible data types are Physical Essence PE, Physical Metadata PM, Abstract Essence AE or Abstract Metadata AM. Further, a data item may also be a Container C, if it contains other data items.

The classification of data is not absolute, but subjective from the sight of the device, and therefore only relevant within a system, e.g. DBMS. It may happen that e.g. one system can interpret a link while another system cannot interpret the same link. Therefore it may happen that e.g. one system classifies certain data as Metadata, consisting of MD_LOAD and MD_LINK, while another system classifies the same data as Essence because it cannot interpret the link. Another example is that e.g. one system can reproduce an MPEG audio layer 3, or MP3, coded file, while another system cannot interpret the MP3 format. In this case the first system classifies an MP3 coded file as Physical Data, but the second system classifies the same file as Abstract Data.

Text is to be regarded as Abstract Data, because text is always a format for saving data. Formatted text can represent a direct physical representation of data, e.g. the PDF format. The format information represents only support information, i.e. if format information is extracted from a PDF file, the pure text being the main information will remain. If the text is extracted, the main information will be lost. Due to the fact that the text represents the main information, also formatted text will be regarded as Abstract Data.

A device in accordance with the principles of the invention executes the following procedure when receiving data on its input:

- If the data contain more than one data item, the output may be: "Data is a Container". More details are given below. Classification may stop here, or may be extended to some, or all, leaves of the hierarchically structured data tree within the Container.
- If data are Metadata, the output may be: "Data are Metadata".
- Otherwise the output may be "Data are Essence",
- If data are Physical Data, an additional output may be "Data are Physical Data".
- Otherwise, if data are Abstract Data, an additional output may be "Data are Abstract Data".
- Advantageously the device can detect and output the type of Physical Data, e.g. "Data is a color picture (24 bits) with resolution x=200 pixels and y=400 pixels".
- If the data format is unknown to the device, and therefore the device is not able to classify the data as Container, Metadata, Essence, Abstract Data or Physical Data, the output may be default-type output, e.g., "Data type is unknown" or "Data are Essence and Abstract data".

Additionally, it is helpful if the device detects whether data is text or not:

- If data is Abstract Data and text, the output of the procedure may be additionally "Data is Text".

This may be implemented by searching for known words e.g. from an electronic dictionary, or searching for groups of characters separated by blanks.

If the input data is a Container, an additional output may be "Data is a Container, i.e. more metadata or essence are contained". Optionally, precise details can be included: "The Container CONTAINS at least 1 Metadata and 1 Essence", or "The Container CONTAINS no Metadata at all" or even "The Container CONTAINS exactly N Metadata items", with N being the amount of Metadata contained in the Container.

If the device can detect the format of the analyzed data, it may output it additionally: "Data format is X". 'X' is the format. Examples for 'X' can be e.g. 'HTML' or 'JPEG'.

FIG. 2 shows an example for a data file containing a combination of Essence and Metadata in the well-known HTML format. In the following, the classification of all elements according to the invention is described.

First the device detects that the first line is <html>, and that therefore the data file should be HTML formatted. It is assumed that the device can interpret the HTML format, and therefore interprets items with "href" attributes in HTML files as links. Since HTML formatted files usually contain a hierarchical structure, the leaf elements of the hierarchy tree are analyzed first. The first element from FIG. 2

<title>This is the title</title> is classified as Essence because there is no link attached to the element.

The element

<a href=http://www.w3c.org>W3C HOME</a> is classified as Metadata, with the string "W3C HOME" being the Essence, or MD_LOAD, and the string "href=http://w3c.org" being the related link, or MD_LINK.

The next leaf element

<p>This is a paragraph</p> contains no link and is therefore classified as Essence.

The next leaf element

<img src="image.gif"> is also classified as Essence because it is only a link, i.e. it contains no MD_LINK with related MD_LOAD. Therefore it cannot be Metadata. The purpose of this link is to reference further Essence, namely the picture data.

When all elements of the first level of hierarchy are analyzed, the next level is investigated. The element <head>
  <title>This is the title</title>
</head> is classified as Essence because it contains no link, but only one element, the element being Essence.

The element

<a href=http://www.w3c.org>
  <img src="image.gif">
</a> is classified as Metadata, with <img src="image.gif">being the MD_LOAD part and the "href" attribute being the related link.

The next element

<body>
. . .
</body> is classified as Container because it groups together Metadata items and Essence items.

Finally, the element

<html>
. . .
</html> is also classified as Container. It groups together an Essence element, namely the <head>element, and a Container, namely the <body>element.

FIG. 3 shows an example for Abstract Metadata. Several data items 3R,3M are grouped in a data unit 3C. The data unit 3C could be e.g. an HTML file. For one of said data items the device has detected that it contains a link 3L, symbolized by the cursor switching from an arrow to a hand when pointing to the text 3E. Since the text 3E and the link 3L belong together, and the text 3E is Essence, they form a Metadata item 3M, and the link 3L is a Metadata link pointing to a reference 3REF outside the data unit 3C. Since the Essence 3E of the Metadata item 3M is text, and text is Abstract Data, the Metadata item 3M is an Abstract Metadata item. Remaining data items 3R within the data unit 3C are any text and a picture. The data unit 3C is a Container, since it contains at least one Metadata item 3M and other, remaining data items 3R.

FIG. 4 shows an example for Physical Metadata. Several data items 4R,4M are contained in a data unit 4C, the unit 4C being e.g. an HTML file. In this case, the device has detected that the picture 4E is associated to a link 4L, symbolized by the cursor switching from an arrow to a hand. The link 4L is pointing to a reference 4REF outside the data unit 4C. Since the picture 4E and the link 4L belong together, they form a Metadata item 4M, with the picture 4E being the Essence of this Metadata. Said Essence 4E is e.g. a JPEG formatted picture, and in the HTML file it may be referenced e.g. as <img src=Anton.jpg width=108 height=73>. Since the device can display it, it is Physical Data, and the Metadata item 4M is Physical Metadata. The data unit 4C is a container, because it contains at least one Metadata item 4M and other items 4R.

FIG. 5 shows an exemplary flow chart of the inventive method. The purpose of the invention is to classify different types of incoming data IN. The incoming data IN are being analyzed, and a first decision block D1 decides whether the format of the incoming data can be detected. If not, 'Unknown' is indicated as an output, and the classification finishes at an end state EX. If the format is known, e.g. HTML, then a second decision block D2 may decide if the incoming data contains unclassified elements. If the answer is 'Yes', the next unclassified data item is picked and forwarded to a third decision block D3. This decision block D3 may decide whether said data item is a Container C, Metadata M or Essence E. The decision is 'Container' if the data item contains another data item already classified as Metadata. The decision is 'Metadata' if the data item contains a link with essence relating to that link. In all other cases the decision is 'Essence'. The decision made in the third decision block D3 is indicated at the output. If the analyzed data item is a Container C, then the procedure returns to the second decision block D2 again, otherwise a fourth decision block D4 is entered. Said fourth decision block D4 decides whether the device can interpret the data item, such that it may disclose further information to the user, e.g. a displayable picture. If the answer is 'Yes', it is indicated at the output that said data item is Physical Data PD, otherwise Abstract Data AD. In the case of said data item being Physical Data PD, format detection may have been done implicitly in said fourth decision block D4. Then a fifth decision block D5 may detect format details and decide whether the detected format shall be indicated, and if so, the format F1, . . . , F3 may be indicated at the output. In the case of said data item being Abstract Data AD, a sixth decision block D6 may decide if the data contains text. If so, this is indicated at the output. If the data item is Abstract Data AD and not text, no further indication is generated. Then the procedure is repeated from the second decision block D2 that decides if further unclassified elements are contained. If this is not the case, then the data item has been classified completely and the end state EX is entered. This embodiment of the invention analyzes all hierarchy levels and leaf elements of Containers, but other embodiments may analyze only some hierarchy levels or leaf elements of Containers.

Advantageously, the described method for data classification can be used in devices for data sorting, data storage e.g. DBMS, or data retrieval e.g. browsers. The described method can be used when different classes of data require different processing, e.g. different search algorithms, different storage methods or areas, different compression methods or different presentation methods.

The invention can be implemented in a separate device, which will classify incoming data with respect to its format, content, and relation to other data, e.g. link, and which provides information about data. This information is especially necessary when it is to recognize, whether these data contain links or these data need special query-methods.

The device can be part of another device or can be realized as hardware or software, e.g. as an application or a plug-in in a PC. Further, it can be updated, e.g. via the Internet or via other sources, so that more and more formats can be recognized, thus this device will update itself and get more and more efficient.

The invention claimed is:

1. Computer-implemented method for automatic detection of data types for data type dependent processing by a technical device, comprising the steps of:
   a) receiving a data file,
   b) analyzing said received data file to determine whether the format of said received data file can be detected,
   c) after detecting the format of the received data file, using said detected format for evaluating a whether said data type of each of at least two data items of different data type wherein the at least two data items are comprised in said received data file and are either of:
   an essence data type being defined to be either data which is interpretable by a device as a link pointing to reference data but with no data referring to said link or data which the device is unable to interpret as a link,
   a metadata subtype being defined as data interpretable by the device as a link pointing to reference data and any essence data referring to said link or of
   a container data type containing at least an essence data item and another data item of any data type,
   d) evaluating for each of the at least two data items whether the device is able to interpret the respective essence data for reproducing a physical representation of the data not interpretable as a link or the linked reference data being said respective essence data so as to indicate that the corresponding data item is either of a physical data type, if the device is able to interpret the respective essence data, or of an abstract data type, and
   e) supplying the result of said evaluations to the device for data type dependent processing of each of said at least two data items.

2. Method according to claim 1, wherein for essence data being evaluated as interpretable by said device for reproducing a physical representation, the respective data item is also indicated with the format type of said interpretable essence data if the format type is one of a number of specified format types.

3. Method according to claim 1, wherein essence data being evaluated as not interpretable by said device for reproducing a physical representation the respective data item is indicated as being in a text format if said not interpretable essence data is detected as being text.

4. Method according to claim 1, wherein said device is a data sorting device, a database management system or a data content browser.

5. Method according to claim 1, wherein said interpretation by said device is displaying said data as a picture.

* * * * *